R. KRONENBERG.
APPARATUS FOR REMOVING THE PROJECTING RIDGES FROM PRESSED METAL WHEELS.
APPLICATION FILED JUNE 28, 1913.
1,080,566.
Patented Dec. 9, 1913.
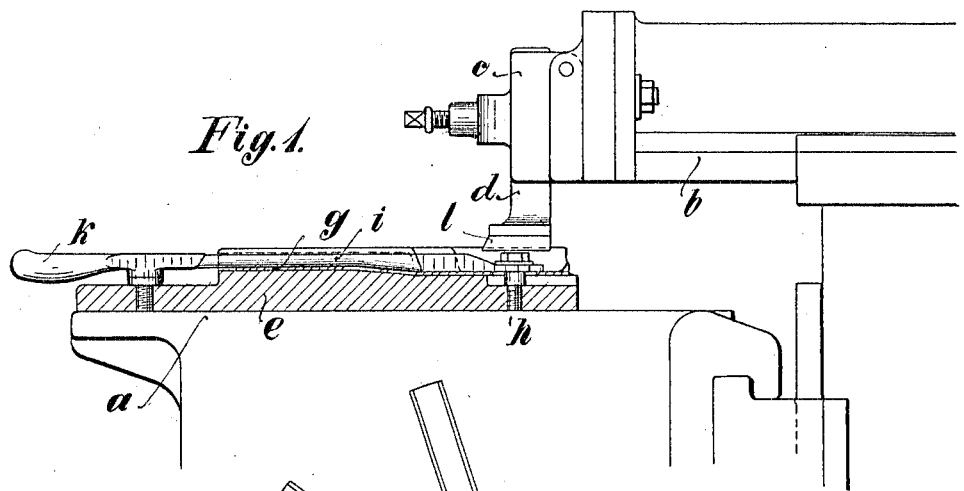
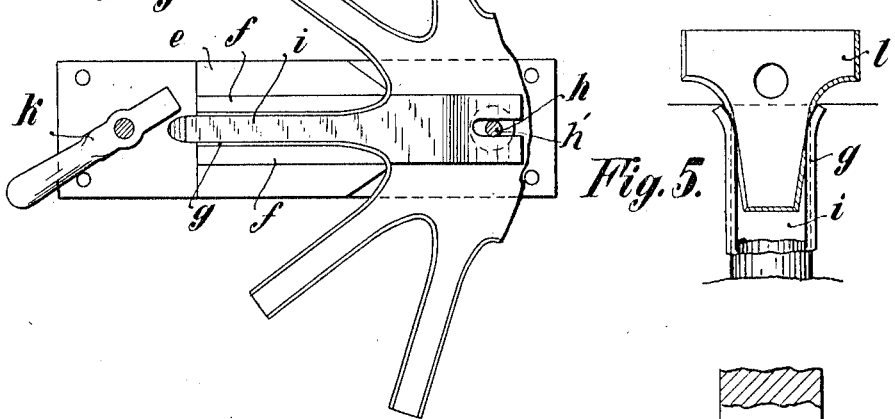
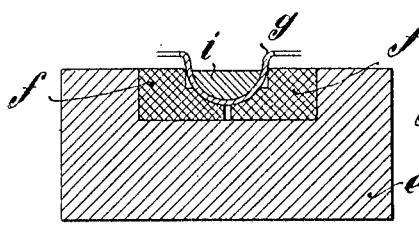
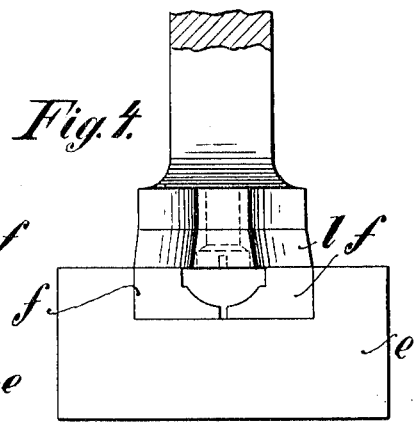
Witnesses:
C. D. Swett.
G. M. Copenhaver.
Inventor
R. Kronenberg
per F. Dittmar
Attorney.

UNITED STATES PATENT OFFICE.

RUDOLF KRONENBERG, OF OHLIGS, GERMANY.

APPARATUS FOR REMOVING THE PROJECTING RIDGES FROM PRESSED METAL WHEELS.

1,080,566. Specification of Letters Patent. Patented Dec. 9, 1913.

Application filed June 28, 1913. Serial No. 776,346.

*To all whom it may concern:*

Be it known that I, RUDOLF KRONENBERG, subject of the King of Prussia, German Emperor, and resident at Ohligs, in the Province of the Rhine, Kingdom of Prussia, German Empire, have invented certain new and useful Apparatus for Removing the Projecting Ridges from Pressed Metal Wheels, of which the following is a specification.

It is already customary to construct a spoke body for wheels by pressing two half bodies out of sheet iron and then uniting them by soldering or welding. In both cases, it is necessary to cause the wheel halves to fit exactly one upon the other and to come uniformly into contact throughout the symmetric plane. In order to effect this, the two wheel halves have usually been worked with cutting tools. This operation is however very tedious and correspondingly expensive in comparison with the much simpler method employed with the apparatus herein described.

According to this invention after the pressing of the half spoke bodies and the stamping out of the superfluous material between the spokes the ridges left standing on these spokes are removed by means of a shearing device. For this operation, use is made of a double edged shearing knife which is guided parallel to each spoke axis above the two lower knives, between which the spoke is bedded exactly in the plane of the cutting.

The operation can best be described in connection with the accompanying drawing which illustrates the apparatus adapted for carrying out the aforesaid method. Preferably, use is made of a shaping machine for this purpose, upon the working table of which the spoke body is held and the sliding head of which carries the shearing knife. The table is of a construction adapted to facilitate the holding of the complete spoke body.

In these drawings: Figure 1 shows a longitudinal section through the holding device, and a side elevation of the slide with the shearing knife. Fig. 2 shows a plan view of the holding device. Fig. 3 shows a transverse section through the lower knives and their supports. Fig. 4 shows a front elevation of the shearing tool. Fig. 5 shows the upper shearing knife in plan view.

In these drawings $a$ indicates the table of the machine, $b$ the working slide with the head $c$ for clamping the tool holder $d$. Upon the table $a$ is attached the support $e$ for the two lower knives $f$. These knives are spaced from one another for the reception of a spoke $g$. The spoke body is revoluble about the screw bolt $h$ which passes through a central opening $h'$. For the adjustment of the work to the lower knives there is provided the part $i$, which extends longitudinally from the central bolt $h$ to the spoke to be sheared, and is held fast at this end by means of a suitable clamp. In the present instance, the end of the holder $i$ which is turned toward the middle is forked, so that it can be pushed under the head of the screw $h$. At the outer end, the holder $i$ is sloped off in the form of a double wedge, so that it can be depressed by means of a revoluble hand lever $k$ provided with corresponding sloping portions. At the same time, the screw $h$ is tightened whereupon the spoke to be operated upon rests firmly against the lower knives $f$. Hereupon, the double edged upper knife $l$ passes from the middle of the spoke body over the spoke which is held fast and thereby cuts off the projecting ridges at both sides, exactly and smoothly. In order that the knife may also operate on the part of the spoke which widens toward the hub, it is correspondingly formed in the shape of a lance head as shown in Fig. 5, of the drawing.

The operation renders possible a much quicker cutting of the spoke body than has hitherto been attainable by cutting tools. The cut is always exactly in the junction plane, so that the halves fit exactly one upon the other and make uniform contact throughout. By this means, the fastening together is materially facilitated.

Having now described my invention, what I claim and desire to secure, is—

1. In a device of the character described, a support, a slide movable thereon, a head on said slide, a tool holder clamped by said head, a double edged knife on said slide, clamps on said support to adjustably hold the outer end of each spoke when operated on, and a headed bolt to adjustably engage a slot in the spoke body.

2. Apparatus of the character described comprising a support, a slide on said support, a head on said slide, a tool holder clamped by said head, two spaced knives on said support to receive a spoke between them, a vertical headed bolt on said support, a spoke holder adapted to be clamped at its inner end by pushing the spoke body under the head of said bolt and at its outer end by a revoluble hand lever adapted to engage that end, a double edged upper knife adapted to be moved to cut off the projecting ridges of said spoke.

In testimony, whereof I have signed my name to, this specification in the presence of two subscribing witnesses.

RUDOLF KRONENBERG.

Witnesses:
LOUIS VANDORY,
EMMA S. BRINTON.

Copies of this patent may be obtained for five cents each, by addressing the "Commissioner of Patents, Washington, D. C."